(12) United States Patent
Hartung

(10) Patent No.: US 8,051,173 B2
(45) Date of Patent: Nov. 1, 2011

(54) DEVICE AND METHOD FOR CONTROLLING AND MONITORING OF MONITORING DETECTORS IN A NODE IN A CLUSTER SYSTEM

(75) Inventor: Klaus Hartung, Salzkotten (DE)

(73) Assignee: Fujitsu Siemens Computers GmbH, Munich (DE)

( * ) Notice: Subject to any disclaimer, the term of this patent is extended or adjusted under 35 U.S.C. 154(b) by 1070 days.

(21) Appl. No.: 11/472,546

(22) Filed: Jun. 22, 2006

(65) Prior Publication Data

US 2007/0011315 A1    Jan. 11, 2007

Related U.S. Application Data

(63) Continuation of application No. PCT/DE2004/002483, filed on Nov. 10, 2004.

(30) Foreign Application Priority Data

Dec. 22, 2003 (DE) .................................. 103 60 535

(51) Int. Cl.
*G06F 15/173* (2006.01)
*G06F 15/09* (2006.01)

(52) U.S. Cl. .................. 709/226; 709/224; 718/103
(58) Field of Classification Search .................. 709/223, 709/226
See application file for complete search history.

(56) References Cited

U.S. PATENT DOCUMENTS

| | | | |
|---|---|---|---|
| 3,932,735 A * | 1/1976 | Giras ........................... | 700/287 |
| 5,537,542 A | 7/1996 | Eilert et al. | |
| 5,542,047 A * | 7/1996 | Armstrong .................... | 709/224 |
| 5,717,858 A * | 2/1998 | Shtayer et al. ................ | 709/224 |
| 5,748,881 A * | 5/1998 | Lewis et al. ................... | 714/47 |

(Continued)

FOREIGN PATENT DOCUMENTS

EP   1131730 B1   8/2003

(Continued)

OTHER PUBLICATIONS

Wamqing Wu et al., "On-line avoidance of the intrusive effects of monitoring on runtime scheduling decisions," Distributed Computing Systems, 1996, Procedings of the 16$^{th}$ International Conference on Hong Kong May 27-30, 1996, Los Alamitos, CA, IEEE, pp. 216-223.

(Continued)

*Primary Examiner* — Patrice Winder
*Assistant Examiner* — Ebrahim Golabbakhsh
(74) *Attorney, Agent, or Firm* — Edell, Shapiro & Finnan, LLC

(57) ABSTRACT

A monitoring device and a method for monitoring at least two resources at a node in a cluster system are provided. A priority is allocated to each of the at least two resources. In the monitoring device and in the method, one of the at least two resources to be monitored is selected on the basis of the associated priority, and a monitoring detector which is required for the monitoring is selected for the resource. Furthermore, the monitoring detector is run, and the monitoring of the resource is performed once by the monitoring detector. The result of the monitoring performed by the monitoring detector is signaled. Selection via the associated priority and the single monitoring save computation time at the node. The monitoring detector can be a dynamic library.

26 Claims, 3 Drawing Sheets

U.S. PATENT DOCUMENTS

| | | | |
|---|---|---|---|
| 5,914,796 A * | 6/1999 | Selin | 398/118 |
| 6,434,613 B1 | 8/2002 | Bertram et al. | |
| 6,633,339 B1 * | 10/2003 | Goto et al. | 348/425.4 |
| 6,666,676 B2 * | 12/2003 | Rodriguez-Rodriguez et al. | 431/67 |
| 6,741,570 B1 * | 5/2004 | Kojima | 370/253 |
| 6,763,359 B2 * | 7/2004 | Lohman et al. | 1/1 |
| 6,854,074 B2 * | 2/2005 | McLellan et al. | 714/39 |
| 6,992,644 B1 * | 1/2006 | Itaba et al. | 345/1.1 |
| 7,194,000 B2 * | 3/2007 | Balachandran et al. | 370/395.42 |
| 2001/0044817 A1 * | 11/2001 | Asano et al. | 709/100 |
| 2002/0069378 A1 * | 6/2002 | McLellan et al. | 714/43 |
| 2002/0188377 A1 * | 12/2002 | Neary et al. | 700/213 |
| 2003/0069684 A1 * | 4/2003 | Reimer | 701/123 |
| 2003/0154268 A1 * | 8/2003 | Sato | 709/223 |
| 2004/0261116 A1 * | 12/2004 | Mckeown et al. | 725/109 |
| 2005/0091352 A1 * | 4/2005 | Alex et al. | 709/223 |
| 2005/0108714 A1 * | 5/2005 | Geye et al. | 718/100 |
| 2006/0085530 A1 * | 4/2006 | Garrett | 709/223 |
| 2006/0117041 A1 * | 6/2006 | Ayres et al. | 707/100 |
| 2006/0117314 A1 * | 6/2006 | Sato | 717/174 |

FOREIGN PATENT DOCUMENTS

| | | |
|---|---|---|
| JP | 08263325 | 10/1996 |
| JP | 2003177945 | 6/2006 |
| WO | 97/10543 A1 | 3/1997 |

OTHER PUBLICATIONS

Gupta R, et al., "Busy-idle profiles and compact task graphs: compile-time support for interleaved and overlapped scheduling of real-time tasks," Real-time systems symposium, 1994., IEEE, 1994, pp. 86-96.

Decision of Refusal in corresponding Japanese Application No. 2006-545900, dated Sep. 2, 2009.

* cited by examiner

DEVICE AND METHOD FOR CONTROLLING AND MONITORING OF MONITORING DETECTORS IN A NODE IN A CLUSTER SYSTEM

CROSS REFERENCE TO RELATED APPLICATIONS

This application is a continuation of PCT/DE2004/002483, filed Nov. 10, 2004, and titled "Device and Method for Controlling and Commanding Monitoring Detectors in a Node of a Cluster System," which claims priority to German Application No. DE 10360535.5, filed on Dec. 22, 2003 and titled "Device and Method for Controlling and Commanding Monitoring Detectors in a Node of a Cluster System," the entire contents of which are hereby incorporated by reference.

FIELD OF THE INVENTION

The invention relates to a device in a node in a cluster system for monitoring and for controlling monitoring detectors. The invention also relates to a method for controlling and for monitoring of monitoring detectors for at least two resources to be monitored in a cluster system.

BACKGROUND

Cluster systems having a plurality of nodes within the cluster, which are formed from individual computers, are often used for software which is intended to have a high availability. For this purpose, the cluster system has monitoring and control software, which is also referred to as a reliant management service RMS, and which monitors high-availability software running on the cluster. The high-availability software itself runs at a node in a cluster or is distributed between different nodes. In general, the monitoring software RMS may also be distributed among different nodes, i.e., it may be decentralized.

If error-free running of the high-availability software or of a part of it is no longer ensured at one node in the cluster, then the monitoring software RMS ends the application or the appropriate part of it and restarts it at a different node. The monitoring of the high-availability application or of a part of the high-availability application is performed by so-called monitoring detectors controlled by the RMS. These detectors each monitor a specific part of the application, which is referred to as a resource, and signal (indicate) the status of the resource back to the monitoring software RMS.

One example of this can be seen in FIG. 6, which shows a node C, which is part of a cluster system. The node C contains the reliant management system RMS as monitoring software. Furthermore, the high-availability application APL is run at the node C, and itself interchanges data with a memory management system M1 via the link N1. The monitoring software RMS starts the individual monitoring detectors D1, D2 and D3 in order to monitor the application APL. Each of these detectors is specifically designed for monitoring one specific resource of the high-availability software APL. For example, the detector D3 monitors the communication link N1 between the application APL and the file management system M1. Another detector D2 checks the high-availability application APL on the basis of continuously checking whether it is still running, and sends back reports. The third detector D1 checks, for example, available temporary memory which is required for the high-availability application APL.

The monitor RMS uses the continuous status messages from the individual monitoring detectors to take suitable measures in the event of failure of individual resources that are being monitored by the monitoring detectors, or in the event of other problems occurring. For example, it can end the high-availability software, and can start again at a second node, which is not illustrated.

The individual monitoring detectors are started independently of one another by the monitoring software RMS. However, this leads to a high system load on the node, since the individual detectors consume memory space and computation capacity in a corresponding manner. In the worst case, a poor configuration or a very large number of monitored resources within one node can result in the monitoring detectors consuming the majority of the available computation capacity. Too little capacity is then available for the actual application. Furthermore, the monitoring software receives status messages from monitoring detectors whose actual running and monitoring of the resource are not required at the present time. Processing of all the status messages that are fed back likewise increases the computation time and unnecessarily loads the monitoring software.

SUMMARY

The invention provides a device in a node in a cluster system, by which the system load for monitoring is matched to requirements that are dependent on the purpose, while nevertheless ensuring adequate monitoring of the resources. The invention further provides a method for controlling and monitoring of monitoring detectors, which operates efficiently, with a low system load at the same time.

A monitoring device is provided in a node in a cluster system for monitoring at least two resources to be monitored at the node of the cluster system. The resources to be monitored can each be allocated a priority which represents a measure of the importance of the resource to be monitored. The device comprises a selection device or component for selecting one resource from the at least two resources to be monitored on the basis of the priorities assigned to the resources to be monitored. The device also has at least one monitoring detector which is designed for the monitoring type of the resource to be monitored. Finally, the device contains an allocation unit for allocating the monitoring detector to the resource to be monitored, as well as a running device or component for running of the monitoring detector. The running device is configured such that, once the resource has been monitored by the running of the monitoring detector, the running device ends or stops the running process.

In this embodiment, the device forms a higher-instance, to which the individual resource to be monitored and, in particular, the monitoring detectors required for the resources to be monitored are subordinate. In particular, the individual monitoring detectors which are required for the resources to be monitored are no longer run independently of one another, but controlled jointly by the device. This approach makes it possible to always use the device to monitor only those resources whose monitoring is necessary at the current time. Furthermore, the device additionally saves computation time at the node, since the monitoring detector which is required for the resource to be monitored is run only after a selection process.

The monitoring is performed such that the running of the monitoring detector is stopped again once the monitoring has been performed. The monitoring is thus performed only once. The device is, of course, designed such that it can also select the resource to be monitored more frequently if required, and runs the monitoring detector that is required for this purpose more than once. In this case, however, the monitoring detector is not operated continuously but is run only until it is fed back a status message relating to the resource to be monitored. However, in this case, the monitoring detector may itself be designed for repeated monitoring. This is in fact advantageous if the monitoring detector produces measured values with a wide scatter. According to the invention, the monitoring detector performs a plurality of monitoring operations and then feeds back one overall status message which represents the individual measured values. The running of the detector is ended after the transmission of the status message.

A method for monitoring at least two resources at a node in a cluster system in which a respective priority can be allocated to the at least two resources comprises: a) selecting one of the at least two resources to be monitored on the basis of the associated priority; b) selecting a monitoring detector which is required for monitoring for the resource to be monitored; c) allocating resource parameters to the monitoring detector; d) starting or running the monitoring detector and running a monitoring of the resource once by the monitoring detector; and e) signaling the result of the monitoring performed by the monitoring detector.

Monitoring of a resource to be monitored is not performed continuously in the method according to the invention, either, but only by running the monitoring detector which is associated with the resource to be monitored once. The monitoring detector itself can, of course, monitor the resource to be monitored in a versatile manner, and in particular also repeatedly at short time intervals, before it feeds back the results. However, according to the invention, a result or a status message is fed back only once per run of the monitoring detector.

The resource to be monitored at one time is selected on the basis of the associated priority. This makes it possible to save computation time at the node in a cluster system, since the monitoring detector is run only when this is necessary on the basis of the associated priority. In particular, the resources and the monitoring detectors are combined, and are regarded as an instance. The individual detectors are thus no longer independent.

The resources to be monitored and the monitoring detectors required for this purpose are of a wide-ranging nature. In one refinement of the invention, a resource to be monitored comprises an entry point within a file system of the node in the cluster system. The monitoring detector is thus designed to check whether the entry point to be monitored is still valid. In one advantageous refinement, the entry point is provided by a second file system in a bulk memory, which is included in the file system of the node in the cluster system. However, the correct monitoring detector that is required to monitor the selected resource is always selected on the basis of that resource.

In another refinement, the monitoring detector is designed to monitor an available hard-disk or other bulk memory.

Once again, in another refinement of the invention, the resource to be monitored is a program that is being run, and the monitoring detector that is required for this purpose is a detector which checks whether the program that is being run is still active. A further resource to be monitored is a network link with a further node in the cluster system. The monitoring detector which is required for this purpose is a detector which checks the status of the network link. Yet another resource is a database to be monitored, the system load at the node, the processor load of a program that is being run or the free available memory within the node in the cluster system. One monitoring detector is provided for each type of the various resources, and performs a specific monitoring process. There may be a plurality of different monitoring types, and thus also different monitoring detectors, for one resource.

In one development of the device, the selection device has a list in which the at least two resources to be monitored are stored in a sequence which is defined by their associated priority. This allows particularly simple selection of the resource to be monitored, since the device uses the list to determine the resources to be monitored, and runs the monitoring detectors. The list can be amended particularly easily by the addition of further resources or the removal of resources from the list. In this case, the device is designed such that a resource which has been selected from the list is automatically provided by the device with the associated monitoring detector that is required for monitoring that resource.

In this case, it is particularly worthwhile for the priorities of the resources to be monitored to be formed by a numerical value. Overall, this achieves a high degree of flexibility, and it is possible to react dynamically to changes, simply by changing the priority of the resource to be monitored.

In a further advantageous refinement of the invention, a defined time period is provided per time interval. The device is designed such that the mean time for running a monitoring detector is shorter than the defined time period. The device is expediently designed for selection of a resource and for running the associated monitoring detector once, until the entire run time of all the monitoring detectors which have been run once reaches the defined time period. This defined time period thus defines a time window per time interval, in which the device can monitor resources. In other words, the maximum computation capacity or computation time that is required by the device within one time interval can be defined. This is feasible since the monitoring detectors are started and monitored by the device, and in consequence are no longer independent of one another.

One development of the invention is characterized in that a second time period, which is required for monitoring of the resource, is allocated to the resource to be monitored. This makes it possible for the device to make an accurate estimate of the time period which is required for monitoring. It is expedient for the device to be designed to determine the time period which is required for monitoring. This is expediently done by means of a time measurement at the monitoring detector.

In another development of the invention, the device has a first interface which is designed to emit status messages from the monitoring detector, once the monitoring detector has been run once. This makes it possible to signal important status messages in particular to a higher-level monitoring and control device. In another development of the invention, the device has a second interface which is designed for reception of user commands. This means that it is also possible to monitor a resource via a monitoring detector at any time at the user end. This is particularly worthwhile when a current status message is required from the resource to be monitored. In one development of this device, the first or the second interface can be designed for reception of resources to be monitored. New resources to be monitored can thus be signaled to the device, or resources being monitored by the device can be removed from the monitoring process again.

It is expedient for the device to be in the form of an autonomous process within the node in the cluster system. The device thus forms an autonomous program. The monitoring detectors form process elements of the device while they are being run.

In another development of the invention, the monitoring detector is in the form of a program which can be run autonomously. This is run once by the device after selection of the resource to be monitored.

In one particularly advantageous development of the invention, the device has at least one sleeping process element which is run at the node in the cluster system but is independent of the resource to be monitored. The running device for running the monitoring detector is in this case designed to link the monitoring detector of the selected resource to be monitored to the independent process element. This development is particularly advantageous when the monitoring detector comprises a function in a dynamic library, or comprises a dynamic library.

The device thus links the function of the dynamic library or the dynamic library at the run time to the sleeping process element, starts it and thus carries out monitoring of the resource to be monitored. The link is disconnected again after the run. An embodiment such as this is particularly efficient in terms of speed and computation. Designing the monitoring detectors as functions in dynamic libraries or as dynamic libraries allows improvements, upgrades or error corrections to be performed in a particularly simple and flexible manner. This also simplifies porting to other cluster operating systems.

In one development of the method, a first time period is defined in a time interval for the monitoring of the resources to be monitored. Monitoring detectors and the process elements linked to them are run only for as long as the defined time period has not been exceeded. In this case, the method can be repeated until the defined time period is reached. The first time period in the time interval thus defines a maximum computation capacity which is required for monitoring.

It is expedient to select at least one of the two resources to be monitored from a list in which the resources to be monitored are stored in the sequence of their priorities. In one development, the list is processed until the defined time period is reached.

It is particularly expedient to increase the priority of a resource to be monitored if no monitoring of the resource by the monitoring detector has been performed in the first time period in that time interval. This prevents resources from never being monitored by an associated monitoring detector owing to lack of monitoring time and a low priority.

It is expedient to allocate a resource to be monitored a secondary time period, which indicates the time duration for monitoring by the monitoring detector. Alternatively, the second time period can also be allocated to the monitoring detector.

In one development of the invention, the second time period for monitoring is determined by running the selected monitoring detector. This is particularly worthwhile when the required time period is not known in advance or parameters which affect the time period for monitoring change during operation.

In one refinement of the method, a sleeping process element is started, which consumes no computation time. Once a monitoring detector has been selected, that monitoring detector is linked to the sleeping process element, and is then run. It is expedient for the monitoring detector to comprise a function in a dynamic library, or to comprise a dynamic library. This allows the monitoring detector to be linked to the sleeping process element particularly quickly and efficiently. Once the monitoring detector has signaled the result, the link is disconnected again, and the sleeping process goes to sleep again. The sleeping process in this case requires no computer time at the node. Alternatively, the sleeping process element can be linked to different monitoring detectors successively. The use of a sleeping process element is particularly flexible.

The above and still further features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

BRIEF DESCRIPTION OF THE DRAWINGS

The invention, whose individual refinements and extensions can be combined as required, will be explained in detail in the following text with reference to the drawings, in which.

DETAILED DESCRIPTION

Figure 4:
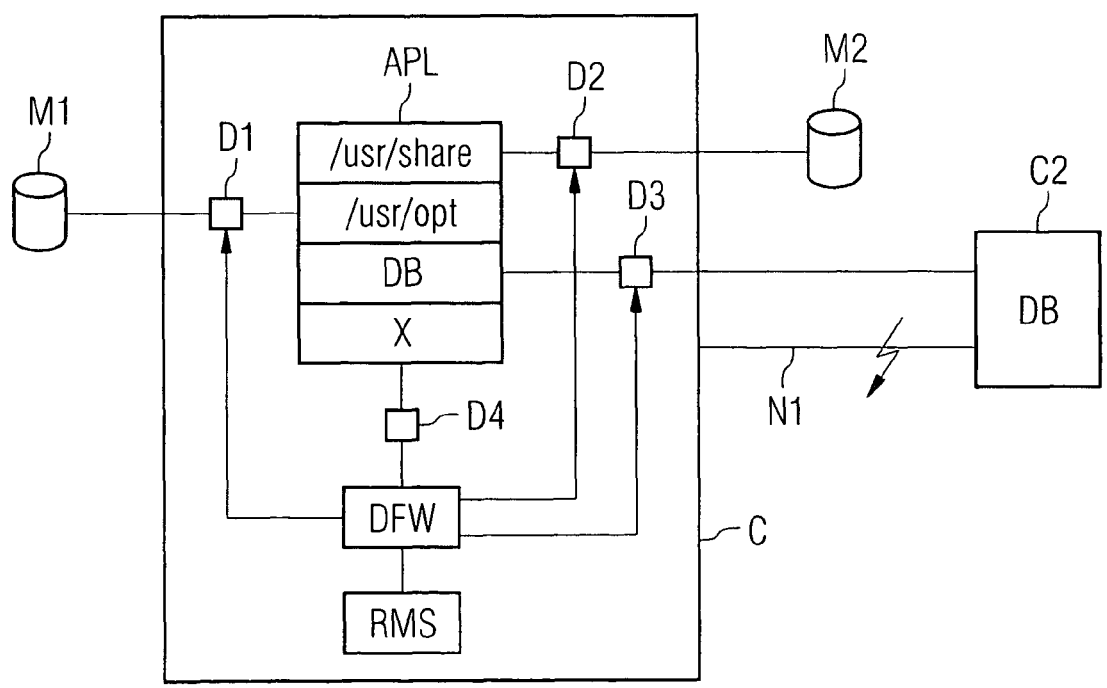
FIG. 4 shows examples of the resources within the cluster system.

FIG. 4 will be used to explain the environment in which the monitoring device according to the invention is used. FIG. 4 shows two nodes C and C2 in a cluster system. These are connected to one another via a network link N1. A high-availability application APL is run at the node C, and contains a plurality of resources to be monitored. The reliant management service RMS is also run at the node C. This monitoring and control software has the aim of monitoring the high-availability of the application APL. If required, it takes further measures to ensure the high availability. For this purpose, it is necessary to monitor the individual resources of the high-availability application APL.

In detail, the resources are two entry nodes within the file system for the node C. These have two external bulk memories M1 and M2, which in this exemplary embodiment are in the form of simple hard-disk memories. The hard-disk memory M1 is attached to the file system for the node C at the entry point "/usr/opt," and the file disk memory M2 is attached at the entry point "/usr/share." In this case, it is necessary to check whether the bulk memories M1 and M2 which have been attached to the file system at these points are functionally compatible and that data can be read from them and written to them.

Furthermore, the high-availability application APL accesses the database DB which is formed at the node C2. For this purpose, it is necessary to check the link between the application APL at the node C and the database DB at the node C2. Finally, the window manager X at the node C for the graphics user interface of the high-availability application APL is also monitored.

According to the invention, a higher-level monitoring device DFW is provided for monitoring all of these resources, and is connected to the reliant management service RMS. The monitoring device DFW is also referred to as an instance or detector framework, and comprises an autonomous process at the node C. The detectors D1, D2, D3 and D4 are part of this device. They are responsible for the monitoring of the resources, and are controlled by the monitoring device DFW. The resources which are intended to be monitored in this case have been transferred, or signaled as parameters, to the instance DFW from the reliant management service RMS.

Figure 2:
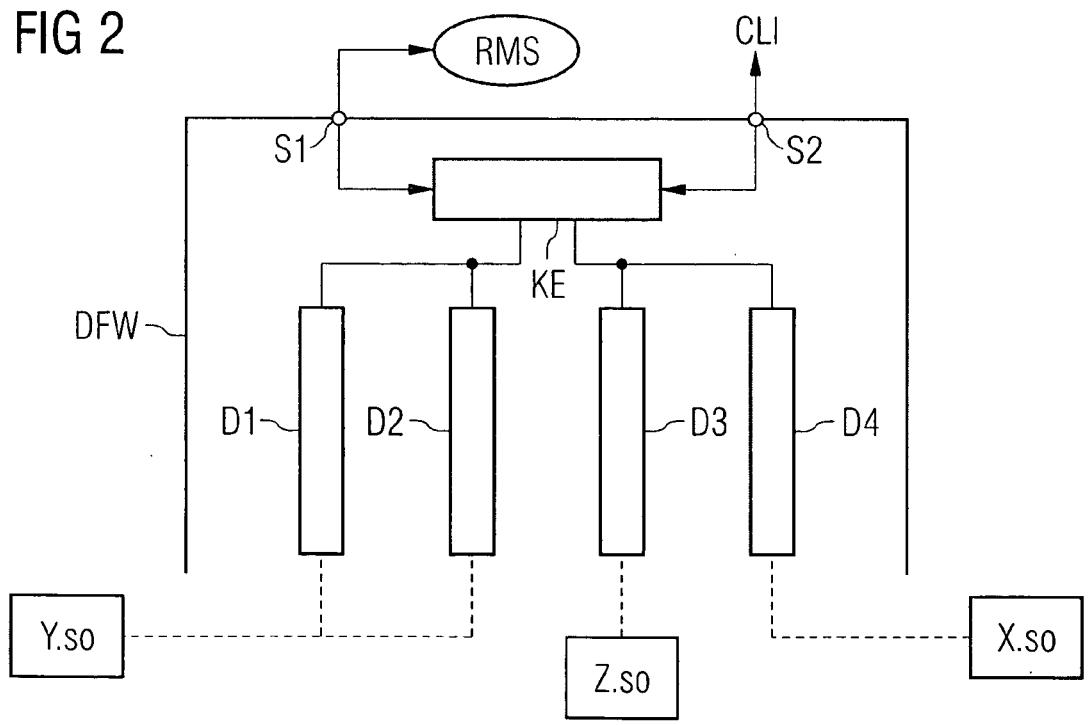
FIG. 2 shows a layout of the running device for running in the device.

FIG. 2 shows a more detailed block diagram of the monitoring device DFW according to the invention. As in FIG. 4, the individual resources are monitored by the individual detectors D1, D2, D3 and D4, although they are controlled by a monitoring device KE. Like the detectors, this is part of the monitoring device and has further logic blocks, which will be explained in detail later.

The higher-level device DFW is responsible for communication with the reliant management service RMS via the interface S1. For this purpose, it contains a monitoring device KE, which receives information about the resources to be monitored from the system RMS. Furthermore, user data and user commands are transferred to the monitoring device KE via the interface S2. The monitoring device KE controls and monitors the individual monitoring detectors D1, D2, D3 and D4.

The individual detectors can be implemented as dynamic libraries Y.so, Z.so and X.so, which are started at the run time. The dynamic block Y.so in this case contains all the functions which are required for monitoring an entry point within the file system. As can be seen, the two monitoring detectors D1 and D2 are implemented by the same library Y.so. In this case, the monitoring detectors even represent the same function in the library Y.so.

The function for monitoring in the dynamic library Y.so together with a set of parameters is performed by the monitoring device KE during monitoring of the entry point to the bulk memories M1 and M2. The two monitoring detectors D1 and D2 thus contain the same function for the run time, but different parameters that transfer the function. The parameters for the detector D1 contain the information for the monitoring of the memory M1, while the parameter which are used for the detector D2 contain the information required for checking of the bulk memory M2.

In the exemplary embodiment, the transferred set of parameters is the entry point in the file system for the memories M1 and M2 and, for example, the nature of the access right to be checked.

The dynamic library Z.so contains all of the necessary functions for monitoring the database link DB between the node C and the node C2 in FIG. 4. When a check is required, then the monitoring device KE starts the function from the dynamic library Z.so. The last dynamic library X contains the functions for the monitoring detector D4, which checks the status of the window manager for the graphics user interface.

The instance DFW furthermore provides a set of functions which can be used jointly for all the individual detectors. For example, this is the interface to the Reliant Management System RMS for the status messages, which are the same for all detectors. At the same time, the running of the individual monitoring detectors D1 to D4 is controlled and monitored by the monitoring device KE. The monitoring detectors are thus completely embedded in the detector framework DFW, and are no longer independent of it.

Figure 1:
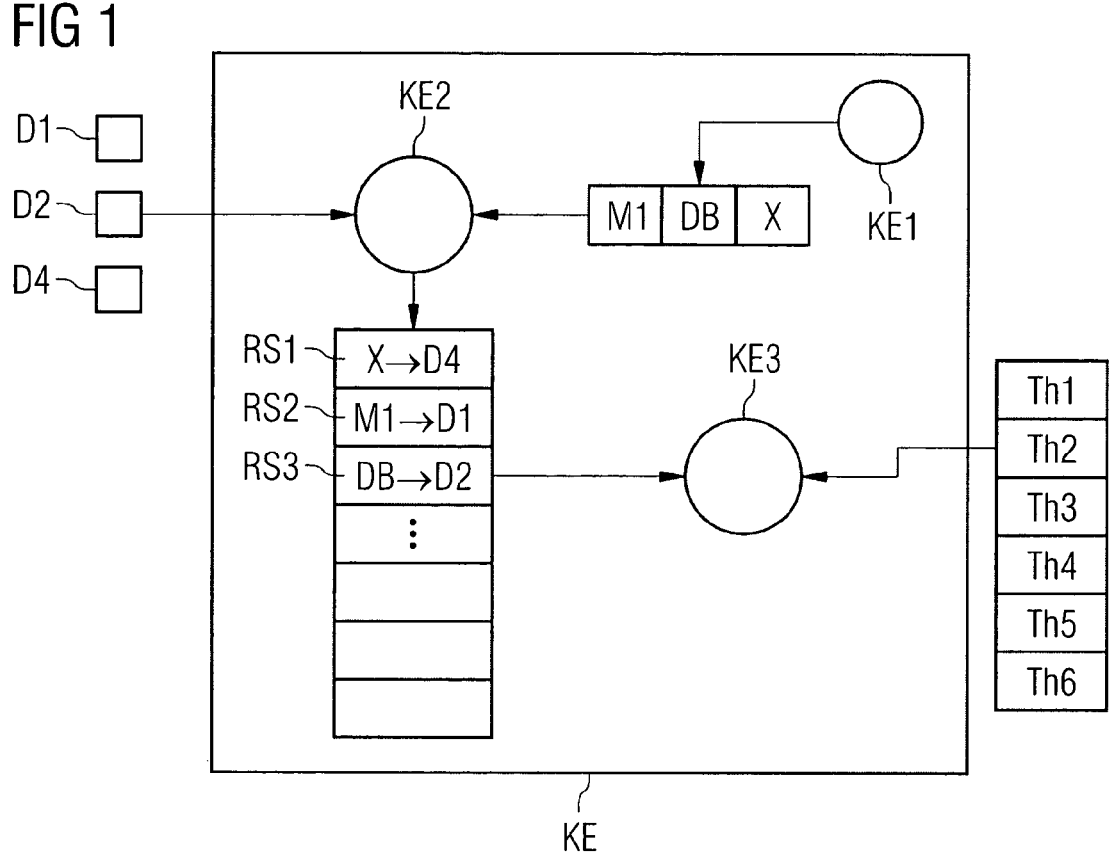
FIG. 1 shows one exemplary embodiment of the device according to the invention.

FIG. 1 explains in detail the design of the monitoring device KE, which itself contains various devices or components. As used herein, terms such as "device," "component," "module," and "unit" are used to refer generally to any hardware, software, or combination thereof that performs one or more particular operations, and do not imply any particular hardware or software structure or architecture and do not necessarily require separate physical structures or processors, unless stated otherwise. FIG. 1 shows a first list with the resources M1, DB and X to be monitored, whose type of monitoring is known by the monitoring device KE. The resources have been signaled to the detector framework DFW from the reliant management service with the job for monitoring. The list contains all the necessary information required for monitoring.

A selection device KE1 is now provided, which selects one resource, in the exemplary embodiment the resource DB, from the list of the resources to be monitored. The selection is made on the basis of a priority. In addition, however, further parameters can also be taken into account, such as the computation time consumed so far or the time required for monitoring. The selection device KE transfers the resource to be monitored to an allocation unit which selects the detector which is suitable for this monitoring type on the basis of the resource, and transfers the necessary parameters to it. After allocation, this results in a resource RS1, RS2 or RS3, which is now ready to perform monitoring, and these are stored in a list, as shown.

Furthermore, the instance DFW contains a number of process elements TH1 to TH6, the so-called threads, which are sleeping. Accordingly, they are sleeping process elements which require no computation time whatsoever but can be linked directly to functions from dynamic libraries to perform monitoring of a resource. The threads have the advantage that no additional computation time need be used to start them, but that they wait to be run once they have been started.

In order to check the resource RS3, the device KE3 links the free process element TH2 to the functions that are required for monitoring from a dynamic library, transfers the parameters which are dependent on the resource RS3 and are allocated by KE2, and performs the process element TH2. In consequence, the resource is monitored by the associated detector. The starting, running, stopping, and synchronization can be, in this embodiment, performed by the POSIX (Portable Operating System Interface for UNIX) Standard for UNIX operating systems. Once the monitoring function has been run, the device KE3 disconnects the link again, and once again makes the thread TH2 go to sleep. The thread can then once again be linked to a further resource. A result message produced by the monitoring detector is fed back from the instance DFW, after running, as a status message to the Reliant Management System RMS. Semphore can be used to control the sequencing of the access to jointly used data between the device KE and the process elements TH.

The use of individual process elements or threads makes is possible to perform a plurality of monitoring operations at the same time. The selection of the resource, the linking of the threads to the monitoring detectors, the starting and stopping of each individual thread are, in this case, controlled by the monitoring device KE. The number of monitoring operations performed in parallel varies over time. The number of process elements TH1 to TH6 also varies over time, since the instance DFW can start additional process elements, or can end them again, as required.

It is also possible to add further resources to be monitored to the instance DFW at any time, or to remove them. This is possible because the resources are not monitored continuously, but only during specific time periods. The resources are just stored in a list, which is variable.

Furthermore, the use of dynamic libraries, which are loaded and run as required, for the formation of detectors makes it possible to achieve a high degree of flexibility. The dynamic libraries can be replaced at any time by extended libraries without having to stop or restart the reliant management service RMS or the detector framework DFW. When the library is extended or amended, the device KE loads the new variant. Extensions, error correction and dynamic reconfiguration are thus possible at any time.

Figure 3:
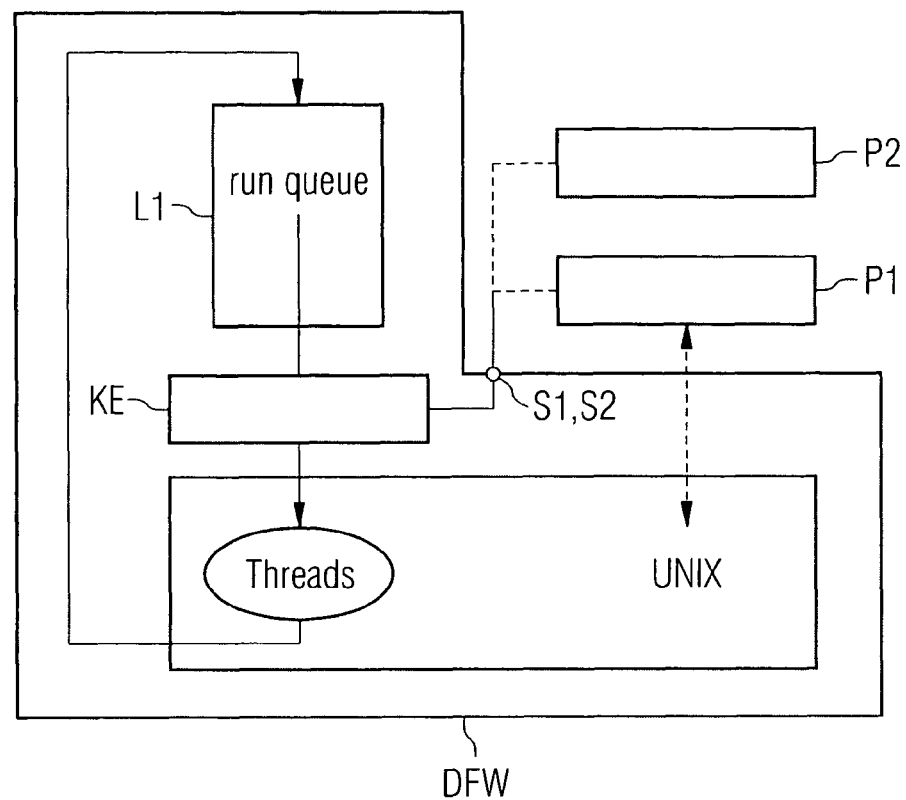
FIG. 3 shows a schematic procedure.

In order to provide adequate computation capacity for the high-availability application APL in the node C in the cluster system, it is necessary to restrict the computation time for the monitoring of the individual resources at the node C. Nevertheless, the resources must be monitored sufficiently often to ensure correct operation of the high-availability application. FIG. 3 shows one exemplary embodiment of the instance DFW, which satisfies these two preconditions.

In a first configuration file P1, a time period is determined in a time interval in which the instance DFW may monitor the resources. The time interval and the time period can be predetermined by a user. This may be a percentage value, for example 15%, of the total computation time, or an absolute value, for example 100 ms in 1 second. Further preconditions, relating for example to the hardware or software applications, can likewise be taken into account via the configuration file.

At the same time, a numerical priority value is defined and allocated for each resource to be monitored, in a second configuration file P2. These are signaled via the interface S1 or S2 of the monitoring device to the instance DFW.

In the exemplary embodiment, the priority values are defined in the configuration file P2 by the reliant management service RMS. For example, it is necessary to assign a higher priority to the resource X of the high-availability application APL like, for example, to the resource for the entry point to the bulk memory M1. These priorities are used by the instance DFW in order to define a monitoring sequence. A resource with a higher priority should be monitored more often than a resource with a lower priority. For this purpose, the individual resources to be monitored are stored in a list L1 on the basis of their priority.

The following table shows the resources for the high-availability application APL as shown in FIG. 4, their associated priorities, the parameters to be transferred and the time after which a check must be performed. These therefore define a maximum value, which must not be exceeded. The last column in the table shows the time duration which the monitoring detector that has been started by the monitoring device KE requires to check the associated resource.

TABLE 1

Resource list with further information

| Resource | Priority | Parameter | Max. time | Time duration |
|---|---|---|---|---|
| M1 | 1 | /usr/opt | 30 s | 30 ms |
| M2 | 3 | /usr/share | 10 s | 30 ms |
| DB | 3 | Network N1 | 5 s | 150 ms |
| X | 5 | Node C | 1 s | 10 ms |

The monitoring device KE now checks the time period which is still available on the basis of the preset in the configuration file P1, the priorities of the resources, the time which has passed since the last check for each resource, as well as the time duration, and selects from this a resource to be checked.

The detector associated with the selected resource is linked as shown in FIG. 1 to a process element or thread that is still free, and the parameters are transferred and the process element is run. After completion of the monitoring, the link is disconnected again, and the process element is available for another link. The resource is once again passed to the list L1, but the time which has passed since the last check, and possibly the priority, are changed. In addition, it is expedient to determine the time which the monitoring detector has required for the run, since preconditions could have changed and a monitoring run could now take a longer or shorter time.

In the case of resources, which it has not been possible to monitor or check within the time window defined by the configuration file P1, the monitoring device KE or the monitoring device DFW increases the priority. This prevents waiting resources from never being checked because their priority is too low.

Figure 5:
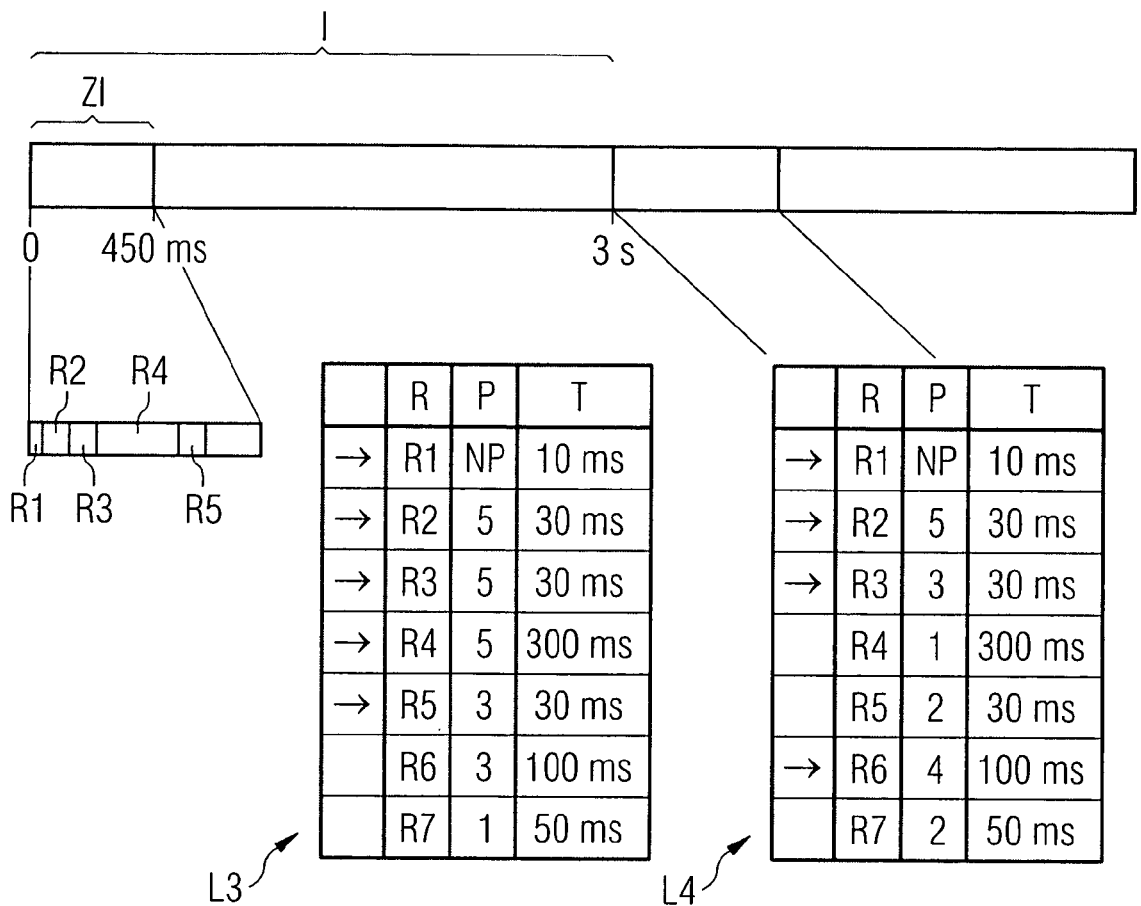
FIG. 5 shows a timing diagram of the resources to be monitored.
Figure 6:
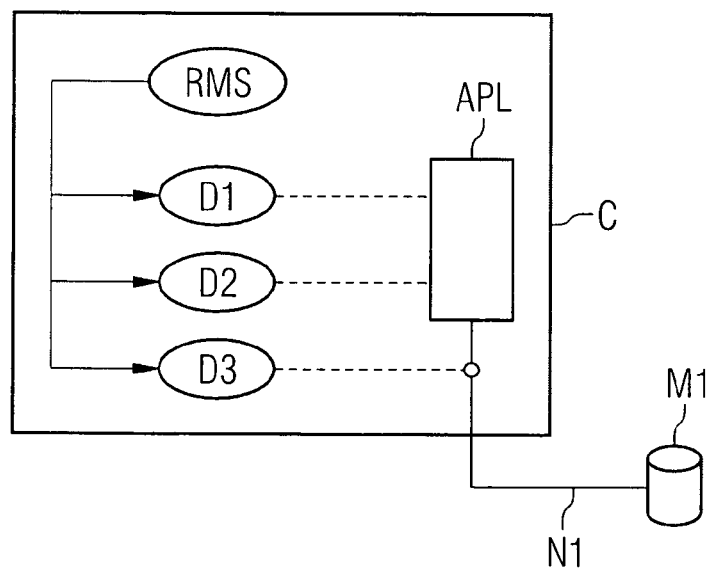
FIG. 6 shows a conventional device with monitoring detectors.

FIG. 5 shows a timing diagram such as this for a monitoring run. Table 2, below, contains the resources R1 to R7, their respective original priority as transmitted from the reliant management system RMS to the detector framework DFW, and the time periods to run them, taken from the configuration file.

TABLE 2

| Resource | Priority | Time duration |
|---|---|---|
| R1 | NP | 10 ms |
| R2 | 5 | 30 ms |
| R3 | 3 | 30 ms |
| R4 | 1 | 300 ms |
| R5 | 2 | 30 ms |
| R6 | 3 | 100 ms |
| R7 | 1 | 50 ms |

As a precept for the instance DFW, a decision was in this case made to perform a check of the resources only within 450 ms in a time interval of 3 s. Furthermore, provision is made for the resources with a priority of less than the value 3 not to be checked in the time interval. More computation capacity is thus provided for further processes which are performed at the nodes.

The list L3 as illustrated in FIG. 5 results after a certain amount of time. The resource R1 with its priority NP and its time duration 10 ms have in this case each been run only once, and are still running in the background. This is a resource for which a "non-polling" detector is provided. This is started and waits for a message from the resource linked to it. In contrast to "polling" detectors, no active check is performed. In consequence, scarcely any computation time is consumed. As soon as the detector R1 receives a message from the resource, it can be ended again by the detector framework DFW.

The resource R2 has the highest priority 5 with a duration of 30 ms, is linked to the associated monitoring detector, and is run. In parallel with this, the monitoring device KE for the detector framework DFW links the resources R3 and R4, which both have the priority 5, to one process element which is present in its list, transfers the parameter sets for the resources to the dynamic library which is provided for monitoring, and runs the threads. The resource R5 with its priority 3 can also be monitored within the time interval. The resource R6 with the same priority has a run time of 100 ms and would thus exceed the stipulated time interval of 450 ms.

In contrast to this, the run time for the monitoring detector for the resource R7 is only 50 ms. However, the resource R7 is not monitored owing to the requirement to check only resources with priorities higher than 3. The resources R1 to R5 are thus actively monitored during the time interval of 3 seconds. The total time required for monitoring is the sum of the individual run times, 400 ms in total. However, the time at which the monitoring is performed within the time interval is not stipulated. This task is performed by the operating system scheduler.

The detector framework is now subject to the requirement not to exceed the 450 ms time duration in a time interval of 3 s on average, or to use no more than 15% of the available computation time for monitoring operations.

The new time interval starts after 3 seconds, and the instance DFW once again starts the monitoring detectors for the resources which are now provided. The resource R1 is still performed. A process element with the monitoring detector for the resource R2 is likewise started on the basis of the high priority 5. Because the resource R3 was checked in the previous time interval, the priority of the resource R3 in the table L4 is reduced to the original value of 3 again. Because the available time is adequate, the monitoring device KE for the detector framework DFW once again links the resource to a free thread, and performs a monitoring process.

Since the resource R4 was monitored in the previous time interval, the resource R4 is now once again allocated the original priority value 1. This also applies to the resource R5. Since it was not possible to check the resource R6 in the previous time interval owing to lack of time, the detector framework DFW increases the priority of the resource R6 by one to the value 4. Monitoring is now performed in this case as well. The total time period for monitoring is now 170 ms.

In this exemplary embodiment, one resource to be monitored is started only once in each time interval. However, it is possible, by way of example, to check the resource R2 more than once within the time interval of 450 ms. Furthermore, in this exemplary embodiment, the priority value is linked to the time at which it was last performed. The priority is increased in each time interval in which the resource has not been monitored.

The resources are frequently represented by data structures within the memory of the cluster. These may be read by monitoring detectors which are formed by the dynamic libraries. This is particularly worthwhile when the resources have different types of monitoring operations.

The second interface S2 to a user interface makes it possible to send commands for immediate checking of a resource at the node. Furthermore, this also makes it possible to read the configuration file for the instance DFW once again, in order in this way to implement dynamic changes.

The device and the method according to the invention provide a capability to no longer use a number of monitoring detectors independently, but to run them as a function of one another. In this case, a monitoring detector is run once, with the monitoring detector itself being able to check the resource to be monitored more than once while it is being run. It is thus possible to check a number of different aspects of the resource, and to feedback a final overall status message.

Furthermore, changes can be introduced dynamically without having to switch off the high-availability software or a monitoring tool, such as the RMS. The jointly used "detector framework DFW" allows particularly effective and time-saving programming by virtue of the jointly used functions. The computation time available at a node is optimally utilized, and also reacts dynamically to changes in the available computation time.

Having described exemplary embodiments of the invention, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

| List of reference symbols | |
|---|---|
| RMS: | Reliant management service |
| D1, D2, D3, D4: | Monitoring detectors |
| APL: | High availability application |
| C, C2: | Nodes |
| N1: | Network |
| M1, M2: | Bulk memory |
| S1, S2: | Interface |
| CLI: | User interface |
| DFW: | Detector framework, monitoring device |
| KE: | Monitoring device |
| KE1: | Selection device |
| KE2: | Allocation unit |
| KE3: | Running device |
| Y.so, Z.so, X.so: | Dynamic libraries |
| R1, . . . , R11: | Detectors allocated to resources |
| M1, M2, X, DB: | Resources |
| TH1, . . . , TH6: | Process elements, threads |
| T: | Time period for monitoring |
| L1: | List |
| P1, P2: | Configuration files |
| P: | Priority |
| L1, L3, L4: | List |
| ZI: | Time period |
| I: | Time |

What is claimed is:

1. A monitoring device in a node in a cluster system for monitoring at least two resources to be monitored at the node of the cluster system, wherein a dynamic priority can be allocated to the resources to be monitored, the monitoring device comprising:

a selection device operable to select one resource from the at least two resources located on the node of the cluster system and assigned to be monitored on the basis of the dynamic priorities assigned to the resources to be monitored;

at least one monitoring detector suitable for monitoring the resource located on the node of the cluster system and assigned to be monitored;

an allocation unit operable to allocate the monitoring detector to the resource located on the node of the cluster system and assigned to be monitored; and a running device operable to run the monitoring detector during a time interval such that, once the resource located on the node of the cluster system and assigned to be monitored has been monitored by the monitoring detector, the running device terminates running of the monitoring detector and increases the dynamic priority assigned to another resource that has not been monitored during the time interval.

2. The device as claimed in claim 1, wherein the selection device includes a list in which the at least two resources to be monitored are stored in a sequence that is defined by their associated priority.

3. The device as claimed in claim 1, wherein the resource to be monitored by the monitoring detector has an associated mean run time which is required for monitoring of the resource by the monitoring detector.

4. The device as claimed in claim 3, wherein the monitoring device determines the mean run time required for monitoring.

5. The device as claimed in claim 3, wherein a defined time period within the time interval is provided for running a monitoring detector within the time period of each time interval and the time period occurring once per time interval, with the mean run time of the at least one monitoring detector being shorter than the defined time period.

6. The device as claimed in claim 1, wherein the at least one monitoring detector comprises a program which can be run autonomously.

7. The device as claimed in claim 1, wherein the at least one monitoring detector comprises a dynamic library or a function in a dynamic library.

8. The device as claimed in claim 1, wherein the monitoring device includes at least one process element, which is run at the node and is independent of the resource to be monitored, wherein the running device links the monitoring detector that is required for the resource to be monitored with the process element.

9. The device as claimed in claim 1, wherein the monitoring device includes a first interface that is coupled to the at least one monitoring detector and emits status messages of the monitoring detector.

10. The device as claimed in claim 9, wherein the monitoring device includes a second interface that receives user commands.

11. The device as claimed claim 1, wherein the resource to be monitored is an entry node within a file system of the node in the cluster system.

12. The device as claimed in claim 1, wherein the resource to be monitored is a program or a database, or a network link.

13. The device as claimed in claim 1, wherein the monitoring device is configured for reception of resources to be monitored via an interface.

14. The device as claimed in claim 1, wherein the monitoring device is an autonomous process.

15. A method for monitoring at least two resources at a node in a cluster system in which a dynamic priority can be allocated to the at least two resources, the method comprising:
   a) selecting one of the at least two resources located on the node of the cluster system and assigned to be monitored on the basis of an associated priority;
   b) selecting a monitoring detector for monitoring the resource located on the node of the cluster system and assigned to be monitored;
   c) allocating the selected monitoring detector to the resource located on the node of the cluster system and assigned to be monitored;
   d) providing a time interval for running the monitoring detector;
   running the monitoring detector during the time interval and terminating the monitoring detector once the resource located on the node of the cluster system and assigned to be monitored has been monitored;
   f) increasing the dynamic priority assigned to another resource that has not been monitored during the time interval; and
   g) indicating the result of the monitoring performed by the monitoring detector.

16. The method as claimed in claim 15, wherein c) is performed via a parameter transfer of the resource to be monitored to the monitoring detector.

17. The method as claimed in claim 15, wherein the dynamic priority is formed by a numerical value.

18. The method as claimed in claim 15, wherein e) includes providing a first time period within the time interval for the monitoring of the resources to be monitored within the time period of each time interval and the time period occurring once per time interval, wherein at least c) to g) are performed only when the first time period is on average not exceeded.

19. The method as claimed in claim 18, wherein the first time period is defined by a percentage value of an available computation time.

20. The method as claimed in claim 18, wherein the priority of a resource to be monitored is increased if no monitoring of the resource to be monitored is performed in the first time period.

21. The method as claimed in claim 15, wherein a list, in which the resources to be monitored are stored in the sequence of their priorities, is produced for selection.

22. The method as claimed in claim 15, wherein a run time for a monitor for a resource to be monitored is allocated by the monitoring detector for the resource to be monitored.

23. The method as claimed in claim 22, wherein the run time for a monitor of a resource to be monitored is determined by running the monitoring detector which is required for monitoring.

24. The method as claimed in claim 15, wherein:
   c) includes linking at least one sleeping process element to the monitoring detector and starting the at least one element; and
   e) includes disconnecting the at least one element from the monitoring detector after monitoring of the resource is complete.

25. The method as claimed in claim 15, wherein an interface is provided, by which a user performs monitoring of a resource via a monitoring detector.

26. The method as claimed in claim 15, wherein the monitoring detector comprises a dynamic library or a function in a dynamic library.

* * * * *

UNITED STATES PATENT AND TRADEMARK OFFICE
CERTIFICATE OF CORRECTION

| | | |
|---|---|---|
| PATENT NO. | : 8,051,173 B2 | Page 1 of 1 |
| APPLICATION NO. | : 11/472546 | |
| DATED | : November 1, 2011 | |
| INVENTOR(S) | : Klaus Hartung | |

It is certified that error appears in the above-identified patent and that said Letters Patent is hereby corrected as shown below:

Column 13, line 45, replace "running the" with -- e) running the --.

Signed and Sealed this
Third Day of January, 2012

David J. Kappos
*Director of the United States Patent and Trademark Office*